(12) United States Patent
Kawasumi et al.

(10) Patent No.: US 6,635,371 B2
(45) Date of Patent: Oct. 21, 2003

(54) FUEL CELL SYSTEM

(75) Inventors: Emi Kawasumi, Kanagawa-ken (JP); Yasukazu Iwasaki, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 205 days.

(21) Appl. No.: 09/862,344

(22) Filed: May 23, 2001

(65) Prior Publication Data

US 2002/0001741 A1 Jan. 3, 2002

(30) Foreign Application Priority Data

May 30, 2000 (JP) ........................................ P2000-159593

(51) Int. Cl.[7] .......................... H01M 8/04; H01M 8/06
(52) U.S. Cl. ........................ 429/17; 429/20; 429/24
(58) Field of Search ........................... 429/17, 19, 20, 429/22, 23, 24, 25

(56) References Cited

U.S. PATENT DOCUMENTS 6,374,166 B1 * 4/2002 Takeda ..................... 429/19 X
6,416,894 B1 * 7/2002 Aoyoma ..................... 429/20
6,447,939 B1 * 9/2002 Iwasaki ................... 429/22 X
6,447,940 B1 * 9/2002 Ueda ........................ 429/24 X

FOREIGN PATENT DOCUMENTS

JP          10-106607       4/1998    ............ H02D/8/06

* cited by examiner

*Primary Examiner*—Stephen Kalafut
(74) *Attorney, Agent, or Firm*—Foley & Lardner

(57) ABSTRACT

Disclosed is a fuel cell system comprising a fuel tank 11 for storing fuel; an evaporator 12 for evaporating the fuel to generate fuel gas; a reforming reactor 13 for generating reforming gas containing hydrogen from the fuel gas; a combustor 14 for burning any one of the fuel and the reforming gas to supply heat to the evaporator 12; and a fuel cell portion 15 for generating electricity by use of the hydrogen contained in the reforming gas generated in the reforming reactor 13, wherein a boiling point temperature of the fuel in the evaporator 12 is estimated based on an operation pressure of the evaporator 12, a vapor temperature of the fuel gas in the evaporator 12 is measured, and when a value obtained by subtracting the boiling point temperature from the vapor temperature becomes below a predetermined value, a flow rate of any one of the fuel and the reforming gas burnt in the combustor 14 is increased.

4 Claims, 3 Drawing Sheets

FUEL CELL SYSTEM

BACKGROUND OF THE INVENTION

The present invention relates to a fuel cell system suitably used for a moving body such as an automobile, more particularly to a fuel cell system capable of stably supplying fuel gas from an evaporator to a reforming reactor.

A fuel cell system for use in a moving body, which is mounted on an automobile and the like, is constituted by a fuel reforming portion for generating hydrogen-rich gas by reforming fuel such as methanol and the like; and a fuel cell portion for allowing the hydrogen-rich gas generated by the fuel reforming portion to react with oxygen-containing gas separately supplied from an air supply apparatus to generate electricity. The fuel reforming portion is constituted by an evaporator for evaporating fuel gas by use of heat generated in burning exhaust; and a reforming reactor for reforming the fuel gas evaporated by the evaporator actually into hydrogen-rich gas.

To allow the fuel cell system to behave with high efficiency and stability, the fuel gas must be stably supplied from the fuel reforming portion to the fuel cell portion, and, in the fuel reforming portion, the fuel gas must be stably supplied from the evaporator to the reforming reactor.

By the way, when a flow rate of the exhaust supplied to a combustor changes due to a load change of a fuel cell, a quantity of the exhaust from a fuel electrode of the fuel cell portion is made to change, and the temperature of the combustor is controlled. Thus, the temperature of the evaporator is kept constant, and a quantity of the fuel gas supplied to the fuel cell portion is maintained. A method to control the supply quantity of the fuel gas by the temperature of the combustor disclosed, for example, in Japanese Patent Laid-Open No. 10-106607 has been known. In this conventional technology, provided are pass lines which branch away from corresponding exhaust gas lines to guide the exhaust from the fuel cell portion to the combustion chamber and allow the exhaust to bypass the corresponding exhaust gas lines, and flow rate control valves are provided on the respective exhaust gas lines on downstream sides from branch points to adjust a flowing quantity of the exhaust flowing into a combustor.

SUMMARY OF THE INVENTION

No consideration for a change of boiling point temperature due to operation pressures of an evaporator and a combustor is taken in the conventional fuel cell systems for use in the moving body, and the evaporator and the combustor are controlled so as to aim at a target temperature of the combustor.

For this reason, even when the temperature of the combustor exceeds a target controlled temperature, a situation that the evaporator does not reach the target temperature so that an enough amount of fuel gas required by a fuel cell portion cannot be supplied to the reforming reactor may occur.

The present invention was invented in consideration of the above described problems of the conventional technology, and the object of the present invention is to provide a fuel cell system capable of stably supplying fuel gas from an evaporator to a reforming reactor.

To achieve the above described object, the fuel cell system of the present invention comprises a fuel tank for storing fuel; an evaporator for evaporating said fuel to generate fuel gas; a reforming reactor for generating reforming gas containing hydrogen from the fuel gas; a combustor for burning any one of the fuel and the reforming gas to supply heat to the evaporator; a fuel cell portion for generating electricity by use of the hydrogen contained in the reforming gas generated in the reforming reactor; a boiling point temperature estimation portion for estimating a boiling point temperature of the fuel in the evaporator based on an operation pressure of the evaporator; a vapor temperature measuring portion for measuring a vapor temperature of fuel gas in the evaporator; and a flow rate control portion for increasing a flow rate of any one of fuel and reforming gas burnt in the combustor when a value obtained by subtracting the boiling point temperature from the vapor temperature becomes below a predetermined value.

In other words, the fuel cell system of the present invention comprises a fuel tank for storing fuel; an evaporator for evaporating said fuel to generate fuel gas; a reforming reactor for generating reforming gas containing hydrogen from said fuel gas; a combustor for burning any one of said fuel and said reforming gas to supply heat to said evaporator; a fuel cell portion for generating electricity by use of said hydrogen contained in said reforming gas generated in said reforming reactor; boiling point temperature estimating means for estimating a boiling point temperature of said fuel in said evaporator based on an operation pressure of said evaporator; and vapor temperature measuring means for measuring a vapor temperature of fuel gas in said evaporator, wherein provided is flow rate control means for increasing a flow rate of any one of the fuel and the reforming gas burnt in said combustor when a value obtained by subtracting said boiling point temperature from said vapor temperature becomes below a predetermined value.

Beside, a method of controlling a fuel cell system of the present invention includes a fuel tank for storing fuel; an evaporator for evaporating said fuel to generate fuel gas; a reforming reactor for generating reforming gas containing hydrogen from said fuel gas; a combustor for burning any one of said fuel and said reforming gas to supply heat to said evaporator; a fuel cell portion for generating electricity by use of said hydrogen contained in said reforming gas generated by said reforming reactor; a boiling point temperature estimating portion; a vapor temperature measuring portion; and a flow rate control portion, said method comprising: estimating by use of said boiling point temperature estimating portion a boiling point temperature of said fuel in said evaporator based on an operation pressure of said evaporator; measuring by use of said vapor temperature measuring portion a vapor temperature of the fuel gas in said evaporator; and increasing a flow rate of any one of the fuel and the reforming gas burnt in said combustor when a value obtained by subtracting said boiling point temperature from said vapor temperature becomes below a predetermined value.

In this fuel cell system, since the boiling point temperature of the fuel is estimated based on the operation pressure in accordance with a state of the operation pressure of the fuel cell portion, it is possible to comply with a change in the boiling point temperature of the fuel gas due to a change in the operation pressure. Moreover, since a control is performed by a difference between the boiling point temperature and the vapor temperature, it is possible to supply the fuel gas of a necessary flow rate to the fuel cell portion sufficiently and effectively. At the same time, a large amount of fuel that has not been vaporized yet is never stored in the evaporator, and the fuel that has been vaporized yet does not get discharged with the fuel gas.

DETAILED DESCRIPTION OF THE PREFERRED EMBODIMENTS

Embodiments of the present invention will be described with reference to the accompanying drawings below.

Figure 1:
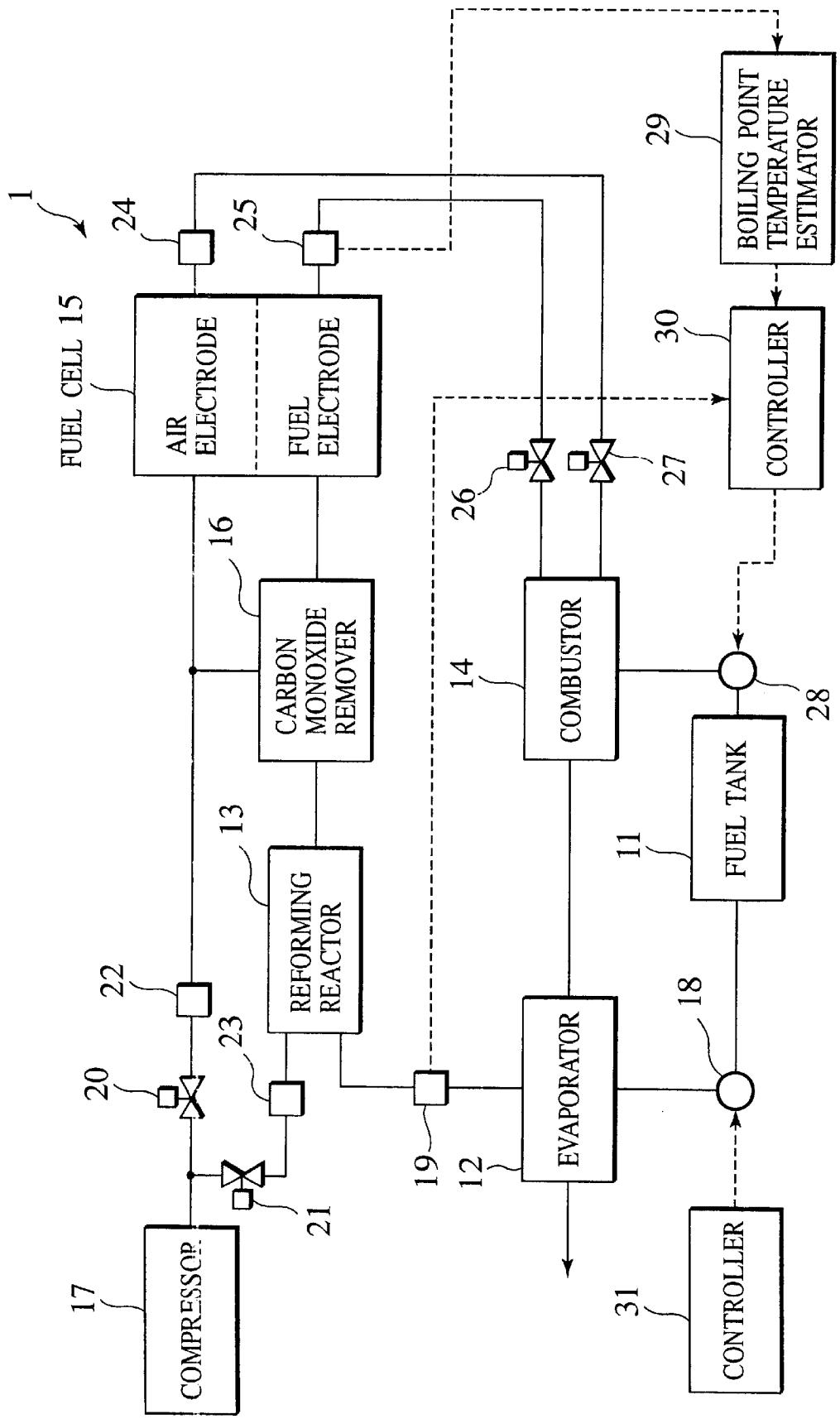
FIG. 1 is a block diagram showing an embodiment of a fuel cell system of the present invention.

FIG. 1 is a block diagram showing an embodiment of the present invention.

Figure 2:
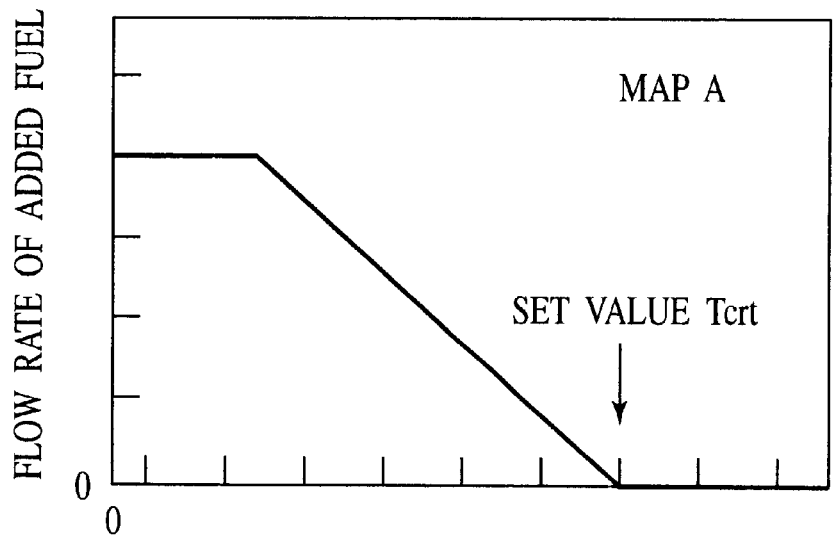
FIG. 2 is a graph for explaining contents for controlling the fuel cell system of the present invention.
Figure 2:
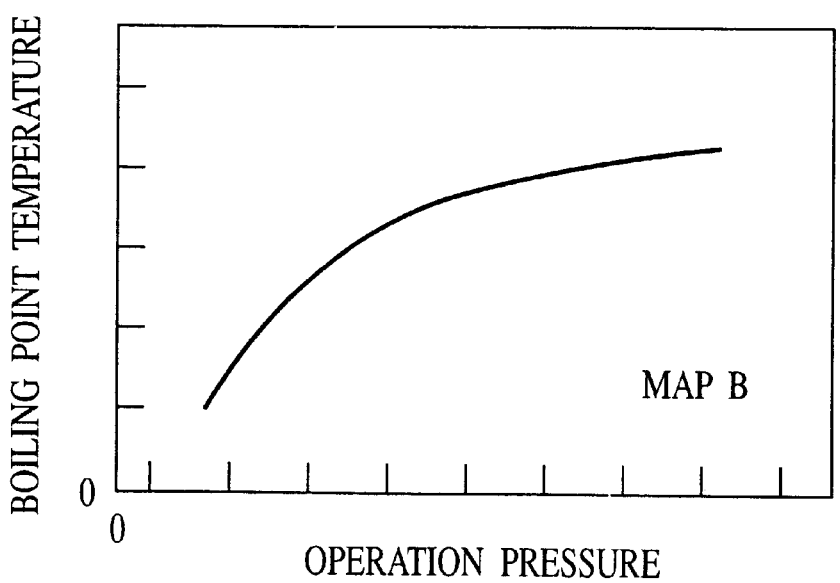

FIG. 2 is a graph for explaining contents for controlling a fuel cell system of this embodiment.

Figure 3:
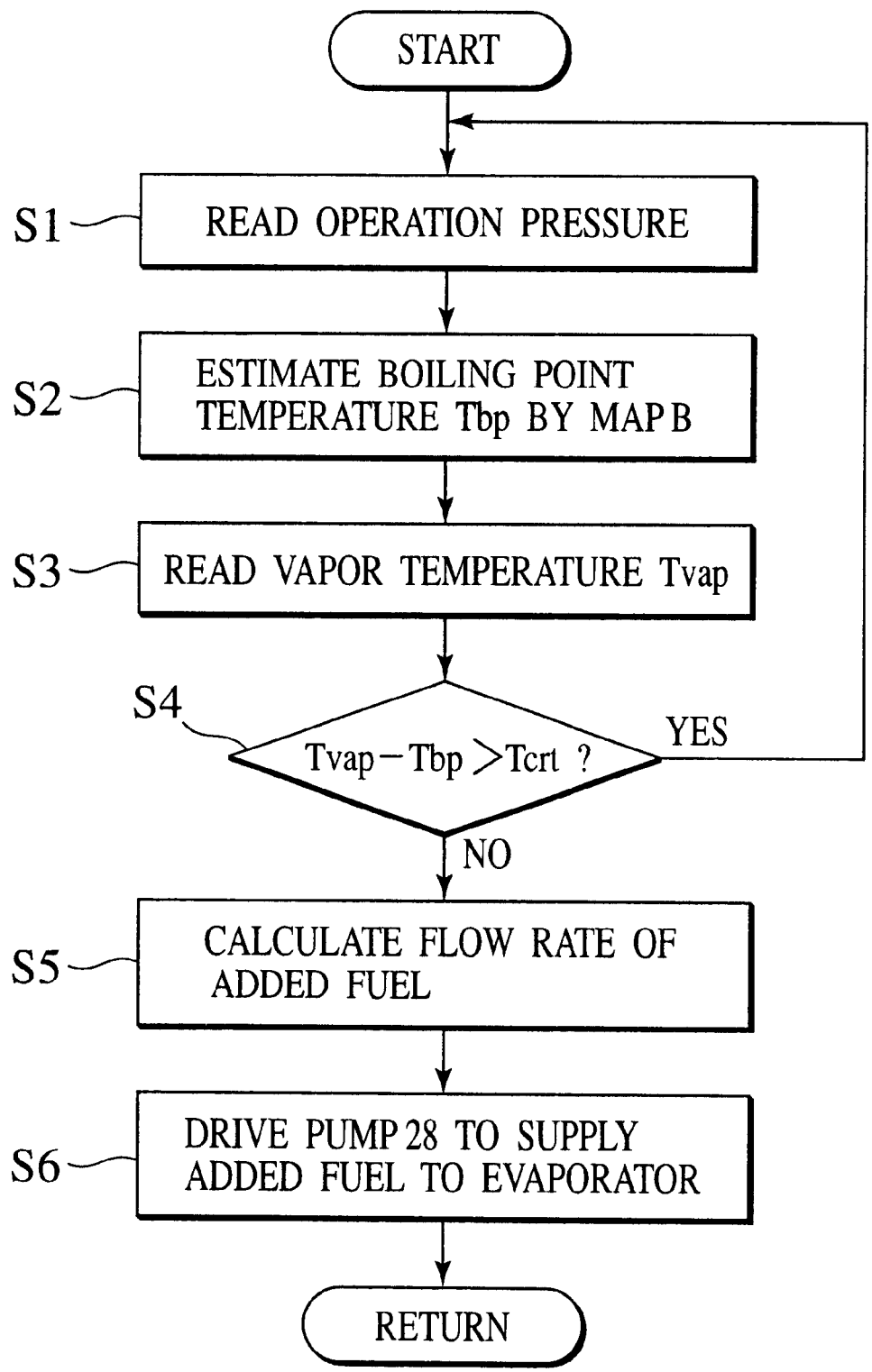
FIG. 3 is a flowchart showing procedures for controlling the fuel cell system of the present invention.

FIG. 3 is a flowchart showing procedures for controlling the fuel cell system of this embodiment.

A fuel cell system 1 in this embodiment comprises a fuel tank 11 for storing fuel; an evaporator 12 for evaporating the fuel to generate fuel gas; a reforming reactor 13 for generating reforming gas containing hydrogen from the fuel gas; a combustor 14 for burning either the fuel or the reforming gas to supply heat to the evaporator 12; and a fuel cell portion 15 generating electricity by use of the hydrogen contained in the reforming gas that has been generated by the reforming reactor 13. The fuel cell system 1 further comprises a carbon monoxide remover 16 for removing carbon monoxide in the reforming gas generated by the reforming reactor 13 and a compressor 17 for supplying air as oxidizing agent to the reforming reactor 13, the fuel cell portion 15 and the carbon monoxide remover 16, respectively.

In the fuel cell system 1 for use in a moving body, which is typified by a fuel cell car, either methanol or mixed liquid formed of water and methanol, which is housed in the fuel tank 11, is sent to the evaporator 12 by a pump 18, and heated to be evaporated. Then, this evaporated fuel gas is sent to the auto-thermal reforming reactor 13.

The fuel gas from the evaporator 12 and air from the compressor 17 are sent to the reforming reactor 13. In the reforming reactor 13, hydrogen-rich reforming gas is generated by the following catalytic reaction of the methanol, the water and oxygen in the air.

$$CH_3OH + H_2O \leftrightarrows CO_2 + 3H_2 \quad (1)$$

$$CH_3OH + \tfrac{1}{2}O_2 \leftrightarrows CO_2 + 2H_2 \quad (2)$$

Here, the reaction represented by the equation (1) is a vapor reforming reaction (endothermic reaction), and the reaction represented by the equation (2) is a partial oxidation reaction (exothermic reaction) of the methanol. The vapor reforming reaction of the equation (1) progresses step-by-step as shown by the following equations (3) and (4).

$$CH_3OH \leftrightarrows CO + 2H_2 \quad (3)$$

$$CO + H_2O \leftrightarrows CO_2 + H_2 \quad (4)$$

Here, the reaction represented by the equation (3) is a decomposition reaction (endothermic reaction) of the methanol, and the reaction represented by the equation (4) is a shift reaction (exothermic reaction) of carbon monoxide. There forming reactor 13 of this embodiment is a heat insulation type reactor operated under an auto thermal condition in which heat evolution and heat absorption are balanced in these equations. Moreover, in an initial stage of the fuel cell system 1 in which the temperature of catalyst is low, the following secondary reactions further occur along with the above reactions.

$$CH_3OH \leftrightarrows HCHO + H_2 \quad (5)$$

$$HCHO \leftrightarrows CO + H_2 \quad (6)$$

The temperature of the reforming reactor 13 in motion ranges from 300° C. to 600° C., and reforming gas containing carbon monoxide in order of several percentages is obtained by a thermodynamic chemical equilibrium. However, carbon monoxide damages a fuel electrode catalyst formed of platinum or the like, of a solid polymer fuel cell 15, and considerably lowers its activity. For this reason, a carbon monoxide remover 16 is provided between the reforming reactor 13 and the fuel cell 15, and the reforming gas is supplied to the fuel cell 15 after carbon monoxide is reduced therefrom to several ten to 100 ppm.

In this embodiment, the reforming gas containing carbon monoxide in order of several percentages is sent to the carbon monoxide remover 16, and the carbon monoxide of the reforming gas is reduced by catalyst promoting the shift reaction represented by the equation (4). The operation temperature of the carbon monoxide remover 16 at this time ranges from 200° C. to 300° C., and the reforming gas containing carbon monoxide in order of several tenth of percentage is obtained by thermodynamic chemical equilibrium.

The carbon monoxide of the reforming gas in which the carbon monoxide is reduced by the shift reaction the catalyst oxidation reaction (exothermic reaction) described below is further reduced to several ten ppm to 100 ppm at most by the following catalyst oxidation reaction (exothermic reaction). Necessary oxygen is supplied from the compressor 17 as air.

$$CO + \tfrac{1}{2}O_2 \leftrightarrows CO_2 \quad (7)$$

Here, since the reaction represented by the equation (7) proceeds in an atmosphere of hydrogen, the burning reaction (exothermic reaction) of hydrogen described below occurs along with the reaction represented by the equation (7). Thus, a selectivity of the equation (7) for the equation (8) affects greatly on an efficiency of the reforming system.

$$H_2 + \tfrac{1}{2}O_2 \leftrightarrows H_2O \quad (8)$$

To remove the heat generated by the reactions represented by the equations (7) and (8) and to keep the operation temperature of the carbon monoxide remover 16 at 100 and several ten ° C., a reaction portion of the carbon monoxide remover 16 which performs the reactions represented by the equations (7) and (8) is cooled by air, LLC, oil or the like. An illustration of the reaction portion of the carbon monoxide remover 16 is omitted.

The reforming gas in which the carbon monoxide is reduced to an extremely low level concentration and air from the compressor 17 are sent to fuel and air electrodes of the fuel cell 15, and electricity generation is performed.

In FIG. 1, reference numeral 19 denotes a temperature sensor for measuring the temperature of the fuel gas which has passed through the evaporator 12, and an output of the temperature sensor 19 is transmitted to a controller (flow rate control portion) 30 to be described later. Furthermore, reference numerals 20 and 21 denote flow rate regulating valves for regulating the flow rate of air sent to the reforming reactor 13, the carbon monoxide remover 16 and the fuel cell 15 from the compressor 17, and the flow rate regulating valves 20 and 21 are feedback-controlled based on measurement values by the flow rate sensors 22 and 23 provided in respective supply systems.

In the fuel cell 15, it is impossible to use entire hydrogen in the reforming gas. Accordingly, the reforming gas that has been used for electricity generation and in which hydrogen partially remains is also sent to the combustor 14. At the same time, the air which has been used for the electricity generation and in which oxygen partially remains is sent to the burner 14. Then, the reforming gas and the air sent to the burner 14 are burnt in the combustor 14. High temperature exhaust obtained in the combustor 14 is sent to the evaporator 12, and recycled as energy for allowing the methanol and the water to evaporate.

In FIG. 1, reference numerals 24 and 25 denote pressure sensors for measuring the pressure of respective exhaust systems of the air electrode and the fuel electrode in the fuel cell 15, and reference numerals 26 and 27 denote flow rate regulating valves for regulating flow rates of the respective exhaust systems of the air electrode and the fuel electrode.

In terms of an efficiency of the fuel cell system for use in the moving body, the operation pressure changes and, at the same time, the flow rate of the gas supplied to the reforming reactor 13 also shows a load change, in accordance with power required for the solid polymer type fuel cell 15. Thus, quantities of the fuel supplied to the evaporator 12 and the combustor 14 also change, and the operation pressures of the evaporator 12 and the reforming reactor 13 change accordingly.

However, a relation as shown in the map B of FIG. 2 exists between a boiling point temperature and the operation pressure. And the operation pressure of the evaporator 12 can be obtained by a pressure loss from the evaporator 12 to the solid polymer type fuel cell 15 and the operation pressure of the solid polymer type fuel cell 15. Therefore, by obtaining the operation pressure of the evaporator 12 from the pressure sensor 25, the boiling point temperature Tbp of the fuel supplied from the fuel tank 11 can be estimated by a calculation. A boiling point temperature estimator 29 shown in FIG. 1 estimates by a calculation the boiling point temperature Tbp by use of the output value from the pressure sensor 25 and the map B shown in FIG. 2.

By the way, the vapor temperature Tvap is never lower than the boiling point temperature Tbp. Specifically, when the vapor temperature Tvap is lower than the boiling point temperature Tbp, no vapor is generated. When the vapor temperature Tvap is equal to the boiling point temperature Tbp, a liquid phase and a vapor phase coexist. Moreover, when the difference between the vapor temperature Tvap and the boiling point temperature Tbp is large, it can be regarded that an amount of heat enough to obtain sufficient fuel gas for electricity generation at the solid polymer type fuel cell 15 is supplied to the evaporator 12. However, as the difference between the vapor temperature and the boiling point temperature becomes smaller, it can be regarded that an amount of heat at the evaporator 12 is decreased.

From this fact, as shown in the map A of FIG. 2, a predetermined temperature difference Tcrt which is a critical value of the difference between the vapor temperature Tvap and the boiling point temperature Tbp is set in advance, an amount of heat is enough when a value obtained by subtracting the boiling point temperature Tbp from the vapor temperature Tvap is larger than the predetermined temperature difference Tcrt, and no additional fuel to the combustor 14 will not be supplied. On the other hand, when the value obtained by subtracting the boiling point temperature Tbp from the vapor temperature Tvap is lower than the predetermined temperature difference Tcrt, it is decided that the amount of heat of the evaporator 12 is short, and an amount of heat supplied to the evaporator 12 is increased to elevate the vapor temperature. A controller (a flow rate control portion) 30 shown in FIG. 1 calculates the necessary amount of heat for the evaporator 12 by using the boiling point temperature Tbp estimated by the above-described boiling point estimator 29 and the vapor temperature Tvap measured by the temperature sensor 19, and decides whether the amount of heat of the evaporator 12 is short or not. The controller 30 outputs a decision result to a pump 28 for supplying the fuel from the fuel tank 11 to the combustor 14.

When the predetermined temperature difference Tcrt is set, the temperature difference Tcrt is set so that a margin is provided between the amount of heat supplied to the evaporator 12 from the combustor 14 and the amount of heat of the evaporator 12 supplied to obtain the fuel gas which is required by the solid polymer type fuel cell 15 to generate sufficient electricity. Accordingly, it is possible to prevent the solid polymer type fuel cell 15 from stopping its operation due to a decrease of the supply amount of the fuel gas because of lack in the amount of heat of the evaporator 12. At the same time, it is always possible to stably supply the fuel gas to the solid polymer type fuel cell 15 and to generate electricity.

Here, an operation sequence of this embodiment will be described with reference to FIG. 3.

An operation pressure of the fuel cell 15 is first read from the pressure sensor 25 in the step 1, and an operation pressure of the evaporator 12 is obtained based on the operation pressure of the fuel cell 15 and a pressure loss from the evaporator 12 to the solid polymer type fuel cell 15, which is a known value.

In the step 2, the boiling point temperature Tbp of the fuel is estimated by a calculation, based on the operation pressure of the evaporator 12 obtained in the step 1 and the map B of FIG. 2. The calculation processing until the step 2 is executed by the boiling temperature estimator 29 shown in FIG. 1.

In the step 3, the actual vapor temperature Tvap measured by the temperature sensor 19 is read, and the difference (Tvap−Tbp) between the vapor temperature Tvap and the boiling point temperature Tbp obtained in the step 2 is compared with the predetermined temperature difference Tcrt in the next step 4. Then, if Tvap−Tbp>Tcrt is satisfied, it is regarded that the amount of heat supplied to the evaporator 12 is enough, and the procedure returns to the step 1. On the other hand, if Tvap−Tbp<Tcrt is satisfied, it is decided that the amount of heat supplied to the evaporator 12 is short, and the procedure moves to the step 5, where a rate of the additional fuel is calculated by use of the map A of FIG. 2. Then, an amount of the fuel supplied to the combustor 14 is increased by use of the pump 28 in the step 6. This operation is executed by the controller (the flow rate control portion) 30.

Thus, the fuel supplied to the combustor 14 increases, and a large amount of heat generated is transmitted to the evaporator 12. Accordingly, the vapor temperature Tvap elevates, and the flow rate of the vaporized fuel increases. Therefore, it is possible to supply gas to the reforming reactor 13 so that electric power can be stably supplied in the fuel cell 15 portion.

The embodiment explained as above is described to make understanding of the present invention easy, and the embodiment is not described to limit the present invention. Accordingly, each constituent component disclosed in the above-described embodiment includes all modifications in design and equivalents belonging to the technological scope of the present invention.

In the above-described embodiment, explained was the fuel cell system 1 for use in the moving body having a structure that the reforming gas from the reforming reactor 13 into the fuel cell portion 15 is allowed to pass though the carbon monoxide remover 16, and supplied to the fuel cell 15 after reducing the carbon monoxide concentration. In the fuel cell system of the present invention, a structure of the carbon monoxide remover 16 is not particularly limited, and the carbon monoxide remover 16 may be applied to a fuel cell system having a structure that a hydrogen separation film is fitted in the downstream of the reforming reactor 13, and pure hydrogen separated thereby is used in the fuel cell 15 while the residual gas is sent to the combustor 14.

A structure of the fuel cell system may be adopted, in which a pressure sensor is fitted between the evaporator 12 and the reforming reactor 13, and a signal of the operation pressure of the evaporator 12 is directly transmitted to the controller (the flow rate control portion) 30. Alternatively, a temperature sensor and a pressure sensor are fitted in the reforming reactor 13, and signals from the temperature sensor and the pressure sensor may be transmitted to the controller (the flow rate control portion) 30 to control the flow rate of the fuel supplied to the combustor 14 by the pump 28. Furthermore, a structure may be adopted, whereas another controller 31 and another pump 18 are provided as shown in FIG. 1, the flow rate of the fuel flowing into the evaporator 12 is controlled, and the fuel is stably supplied to the reforming reactor 13.

Moreover, the following structure may be adopted. Specifically, the flow rate of the fuel gas supplied from the evaporator 12 to the reforming reactor 13 is measured, and a surplus heat amount in the evaporator 12 is obtained based on the difference between the temperature of the evaporator and the boiling point temperature, together with the above-described flow rate of the fuel gas. Then, based on the surplus heat amount, the amount of the fuel supplied to the combustor 14 is controlled, and the amount of heat supplied from the combustor 14 is adjusted.

The entire content of a Japanese Application No. P2000-159593 with a filing date of May, 30, 2000 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A fuel cell system, comprising:

a fuel tank for storing fuel;

an evaporator for evaporating said fuel to generate fuel gas;

a reforming reactor for generating reformed gas containing hydrogen from said fuel gas;

a combustor for burning one of said fuel in said fuel tank and said reformed gas to supply heat to said evaporator;

a fuel cell for generating electricity by use of said hydrogen contained in said reformed gas generated in said reforming reactor;

a boiling point temperature estimation portion for estimating a boiling point temperature of said fuel in said evaporator based on an operation pressure of said evaporator;

a vapor temperature measuring portion for measuring a vapor temperature of fuel gas in said evaporator; and a flow rate control portion for increasing a flow rate of one of fuel and reformed gas burnt in said combustor when a value obtained by subtracting said boiling point temperature from said vapor temperature becomes below a predetermined value.

2. The fuel cell system according to claim 1, further comprising:

a system for supplying surplus reformed gas, which is surplus in said fuel cell, to said combustor, and for burning the reformed gas therein, wherein when the value obtained by subtracting said boiling point temperature from said vapor temperature becomes below the predetermined value, electric power taken out from said fuel cell portion is suppressed to increase an amount of heat generated in said combustor.

3. A fuel cell system, comprising:

a fuel tank for storing fuel;

evaporating means for evaporating said fuel to generate fuel gas;

reforming means for generating reformed gas containing hydrogen from said fuel gas;

combusting means for burning one of said fuel in said fuel tank and said reformed gas to supply heat to said evaporating means;

a fuel cell for generating electricity by use of said hydrogen contained in said reformed gas generated in said reforming means;

boiling point temperature estimating means for estimating a boiling point temperature of said fuel in said evaporating means based on an operation pressure of said evaporating means;

vapor temperature measuring means for measuring a vapor temperature of fuel gas in said evaporating means; and flow rate control means for increasing a flow rate of one of the fuel and the reformed gas burnt in said combusting means when a value obtained by subtracting said boiling point temperature from said vapor temperature becomes below a predetermined value.

4. A method of controlling a fuel cell system including a fuel tank for storing fuel; an evaporator for evaporating said fuel to generate fuel gas; a reforming reactor for generating reformed gas containing hydrogen from said fuel gas; a combustor for burning one of said fuel in said fuel tank and said reformed gas to supply heat to said evaporator; a fuel cell for generating electricity by use of said hydrogen contained in said reformed gas generated by said reforming reactor, said method comprising:

estimating a boiling point temperature of said fuel in said evaporator based on an operation pressure of said evaporator;

measuring a vapor temperature of the fuel gas in said evaporator; and increasing a flow rate of one of the fuel in said fuel tank and the reformed gas burnt in said combustor when a value obtained by subtracting said boiling point temperature from said vapor temperature becomes below a predetermined value.

* * * * *